(No Model.)
C. BEIDLER.
Mechanical Movement.
No. 232,232. Patented Sept. 14, 1880.
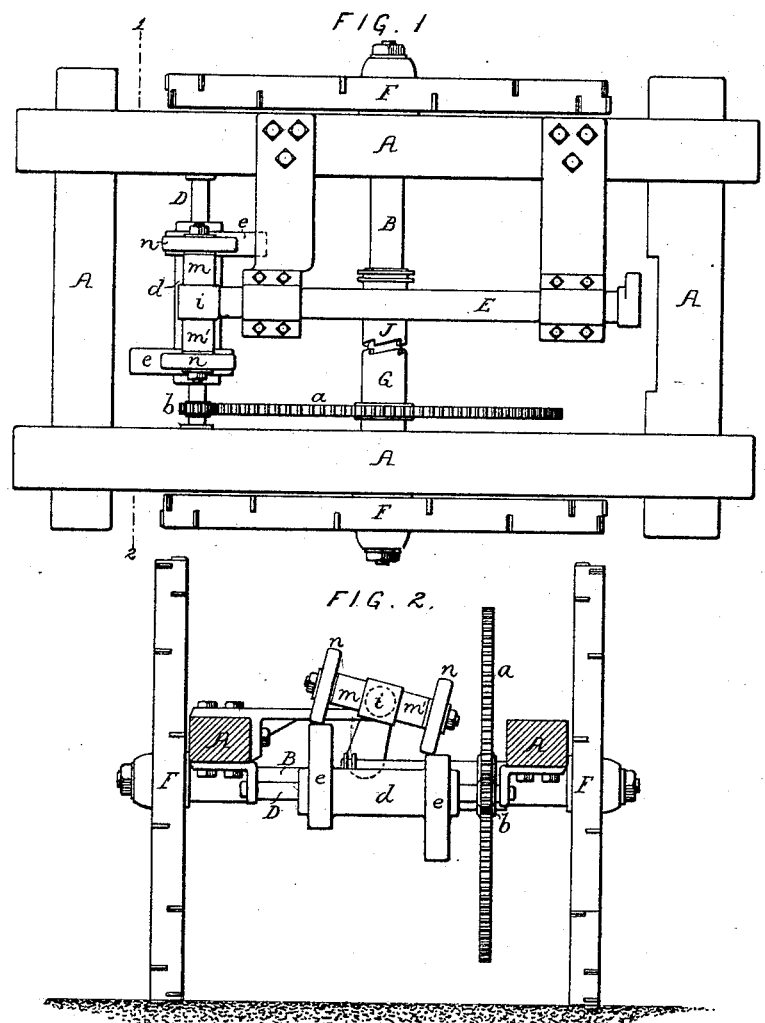

United States Patent Office.

CHARLES BEIDLER, OF ALLENTOWN, PENNSYLVANIA, ASSIGNOR OF ONE-HALF OF HIS RIGHT TO EDWARD HARVEY, OF SAME PLACE.

MECHANICAL MOVEMENT.

SPECIFICATION forming part of Letters Patent No. 232,232, dated September 14, 1880.

Application filed June 14, 1880. (No model.)

*To all whom it may concern:*

Be it known that I, CHARLES BEIDLER, a citizen of the United States, residing in Allentown, in the county of Lehigh and State of Pennsylvania, have invented a new Mechanical Movement, of which the following is a specification.

My invention relates to an improvement in that class of mechanical movements in which a rapid oscillating movement is imparted to a rock-shaft from a slowly-rotating driving-shaft by means of cam-wheels on the latter acting on arms on the said oscillating shaft; and the object of my invention is to reduce the wear and tear of parts and waste of power incidental to motions of this class by the interposition of gearing which enables me to impart the required rapid movement to the rock-shaft by simple and easily-working eccentries in place of the usual wheels with a multiplicity of abrupt projections.

In the accompanying drawings, Figure 1 is a plan view, showing the application of the movement to a reaping or mowing machine, and Fig. 2 a section on the line 1 2, Fig. 1.

A represents a frame, which is provided with suitable bearings for two transverse shafts, B and D, and a longitudinal shaft, E. The shaft B is the driver, and in this instance is the main shaft of a harvester, and is provided with the usual wheels F F.

E is the shaft, to which a rapid oscillating motion is to be imparted, this shaft being provided at one end with arms $m\ m$, each having an anti-friction roller. This rock-shaft, with its arms and rollers, is an old device; but it has usually been combined with two large wheels on the driving-shaft, the said wheels having a number of abrupt projections which act on the anti-friction rollers of the arms, so as to impart the desired rapid oscillating or rocking movement to the shaft E. This device I consider defective because the projections on the driving-wheels must necessarily be abrupt, and therefore objectionable as a means of transmitting power, the desired rapid rocking of the shaft being obtained, but by means which necessarily cause a rapid wearing of the operating parts and an undue absorption of the power of the driving-shaft. In order to overcome this difficulty, and at the same time impart the desired rapid motion to the rock-shaft, I use an intermediate shaft, D, provided with two eccentrics, $e$, for acting on the anti-friction rollers $n\ n$ of the arms $m\ m$ of the shaft E, the said eccentrics being so secured to the shaft D that they must impart a rocking motion to the shaft E, the desired rapidity of the movement being obtained by gearing consisting of a large cog-wheel, $a$, on the driving-shaft and a pinion, $b$, on the shaft D, which must necessarily revolve at a much faster speed than the said driving-shaft. It is the intervention of this gearing which enables me to use the gently-operating eccentrics for actuating the rock-shaft in place of the objectionable power-absorbing abrupt projections heretofore employed in that class of motions to which my invention relates.

The shaft E is provided with an arm, which may be connected to the cutter-bar of a harvester, or the movement may be adopted wherever a rapid vibrating motion has to be imparted to a shaft from a slowly but continuously rotating driving-shaft.

I claim as my invention—

A mechanical movement in which a driving-shaft and a rock-shaft, E, and its arms $m\ m$, provided with rollers, are combined with an intermediate shaft having eccentrics $e\ e$, and with gearing by which the said intermediate shaft is rotated by the driving-shaft at a greater speed than the latter, all substantially as set forth.

In testimony whereof I have signed my name to this specification in the presence of two subscribing witnesses.

CHARLES BEIDLER.

Witnesses:
T. B. LEISENRING,
W. G. HOFFMAN.